UNITED STATES PATENT OFFICE.

LOUIS McMURRAY, OF BALTIMORE, MARYLAND.

IMPROVEMENT IN PROCESSES FOR PRESERVING CORN.

Specification forming part of Letters Patent No. 139,595, dated June 3, 1873; application filed May 20, 1873.

*To all whom it may concern:*

Be it known that I, LOUIS McMURRAY, of the city and county of Baltimore and State of Maryland, have invented a certain new and Improved Process of Preserving Green Corn, of which the following is a specification:

The process I employ is as follows: After selecting the ears I cut the green-corn from the cob. I crush the cob in a suitable mill, then moisten it with water, and then press it to extract therefrom the flavored juice. This juice I clarify and purify by first boiling and then straining. I then mix this juice while still heated with the cut green corn in the proportions of one hundred (100) pounds of corn to from fifteen (15) to twenty-five (25) pounds of juice, according to the quality of corn. This mixture is then brought to about the boiling-point, from 210° to 212° Fahrenheit, being placed in a water-jacketed covered vessel, carefully heated by steam or other agency to prevent injury to or discoloration of the corn. The temperature of the moistened corn can be ascertained by the thermometer in the usual way.

The treatment of the corn with the juice, as just described, acts to enrich the corn, to keep it white, and in more natural condition, preventing discoloration, preserving the original flavor, and preventing the smoky taste which is noticeable in corn packed by other processes. The addition of the juice while still heated partially cooks the corn, and requires less expenditure of heat in the water-jacketed vessel to bring the mixture to the boiling-point.

The corn thus treated with the purified juice, and brought to about the boiling-point, is at once put into cans from which the heated corn serves to effectually expel the air. The cans are then immediately sealed, and are put into a bath of salt-and-water, or of water mingled with suitable chemical ingredients, which will cause the bath to have a considerable higher boiling-point than water. In putting up green-corn, however, I much prefer the salt-and-water bath, which has a boiling-point of 228° Fahrenheit. The bath, when the corn is put in, is not necessarily of any fixed temperature. I prefer that it should be at about 226° Fahrenheit, thence gradually elevated to 228° or 230°. When the bath ranges between these temperatures the cans need remain therein only from two to two and one-half hours. Should the temperature of the bath range between 220° and 222°, or 224°, the cans require to remain therein about four hours.

In any case no venting is required, and this bath completes the process, the can being then in condition to keep for a great length of time in fine condition, without discoloration, and with its natural flavor well preserved.

The bath of salt-and-water is of great value in that its boiling-point, while of such height as to speedily complete the process, shortening greatly the time heretofore required for the same, still does not exceed the point (228° to 230°) beyond which heat would damage the corn.

The preliminary heating of the corn after it has been moistened serves to cook it, so that it goes into the can in a cooked condition, and all that is then required is the final heating needed for its preservation.

I do not claim as new the article of green corn preserved in a green state after removal from the cob, nor the process of preserving said corn so removed from the cob, by putting it up in cans and then hermetically sealing and heating the same.

Having described my invention, what I claim, and desire to secure by Letters Patent, is—

1. The process of preserving corn by first mixing it with the prepared juice, then heating or cooking the same, and then putting it into cans and subjecting it to final heating at the temperatures stated, substantially as described.

2. The use of the flavored liquid obtained from the cob in preserving corn, substantially as set forth.

In testimony whereof I have signed my name to this specification before two subscribing witnesses.

LOUIS McMURRAY.

Witnesses:
 EDM. F. BROWN,
 JOHN BUEREN.